United States Patent
Jang et al.

(10) Patent No.: US 11,880,990 B2
(45) Date of Patent: Jan. 23, 2024

(54) METHOD AND APPARATUS WITH FEATURE EMBEDDING

(71) Applicant: Samsung Electronics Co., Ltd, Suwon-si (KR)

(72) Inventors: Seokhwan Jang, Anyang-si (KR); Minjung Son, Suwon-si (KR); Hyun Sung Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 17/182,580

(22) Filed: Feb. 23, 2021

(65) Prior Publication Data

US 2022/0092802 A1   Mar. 24, 2022

(30) Foreign Application Priority Data

Sep. 21, 2020   (KR) ........................ 10-2020-0121531

(51) Int. Cl.
| | | |
|---|---|---|
| *G06T 7/50* | (2017.01) | |
| *G06T 7/70* | (2017.01) | |
| *G06N 3/08* | (2023.01) | |
| *G06T 17/00* | (2006.01) | |
| *G06T 7/80* | (2017.01) | |

(52) U.S. Cl.
CPC .................. *G06T 7/50* (2017.01); *G06N 3/08* (2013.01); *G06T 7/70* (2017.01); *G06T 7/80* (2017.01); *G06T 17/00* (2013.01)

(58) Field of Classification Search
CPC .... G06T 7/50; G06T 7/70; G06T 7/80; G06T 17/00; G06T 2210/56; G06T 7/593; G06T 2207/10028; G06T 2207/20084; G06N 3/08; G06N 3/044; G06N 3/045; H04N 13/268

See application file for complete search history.

(56) References Cited

U.S. PATENT DOCUMENTS

| | | |
|---|---|---|
| 2012/0114251 A1 | 5/2012 | Solem et al. |
| 2017/0085863 A1 | 3/2017 | Lopez et al. |

(Continued)

FOREIGN PATENT DOCUMENTS

| | | |
|---|---|---|
| KR | 10-2008-0076610 A | 8/2008 |
| KR | 10-2013-0094015 A | 8/2013 |

(Continued)

OTHER PUBLICATIONS

Lin, Chen-Hsuan "Learning Efficient Point Cloud Generation for Dense 3D Object Reconstruction" The Thirty-Second AAAI Conference on Artificial Intelligence (Year: 2018).*

(Continued)

*Primary Examiner* — Molly Wilburn
(74) *Attorney, Agent, or Firm* — NSIP Law

(57) ABSTRACT

A method and apparatus with feature embedding is provided. The method includes estimating a depth map for each of plural two-dimensional (2D) input images, transforming the depth maps into three-dimensional (3D) information in a point cloud form based on an aggregation of the depth maps, and generating an embedded feature by applying the 3D information to a machine learning model, where the embedded feature includes information about a 3D shape corresponding to a 2D object in the plural 2D input images.

36 Claims, 10 Drawing Sheets

(56) References Cited

U.S. PATENT DOCUMENTS

| | | | |
|---|---|---|---|
| 2017/0161590 A1 | 6/2017 | Boulkenafed et al. | |
| 2017/0264887 A1 | 9/2017 | Huang et al. | |
| 2020/0126257 A1 | 4/2020 | Tauber | |
| 2020/0380720 A1* | 12/2020 | Dixit | G06T 7/194 |
| 2021/0334599 A1* | 10/2021 | Pirk | G05B 13/027 |

FOREIGN PATENT DOCUMENTS

| | | |
|---|---|---|
| KR | 10-2014-0049361 A | 4/2014 |
| KR | 10-2015-0128300 A | 11/2015 |
| KR | 10-1644087 B1 | 8/2016 |
| KR | 10-2017-0067373 A | 7/2017 |
| KR | 10-2017-0130150 A | 11/2017 |
| KR | 10-2018-0041668 A | 4/2018 |
| KR | 10-2018-0123443 A | 11/2018 |

OTHER PUBLICATIONS

Su, Hang, et al. "Multi-view convolutional neural networks for 3d shape recognition." *Proceedings of the IEEE international conference on computer vision*. 2015. (9 pages in English).

Choy, Christopher B., et al. "3d-r2n2: A unified approach for single and multi-view 3d object reconstruction." *European conference on computer vision*. Springer, Cham, 2016. (17 pages in English).

Qi, Charles R., et al. "Pointnet++: Deep hierarchical feature learning on point sets in a metric space." *arXiv preprint arXiv:1706.02413* (2017). (10 pages in English).

Qi, Charles R., et al. "Pointnet: Deep learning on point sets for 3d classification and segmentation." *Proceedings of the IEEE conference on computer vision and pattern recognition*. 2017. (9 pages in English).

Kar, Abhishek, et al. "Learning a multi-view stereo machine." *arXiv preprint arXiv:1708.05375* (2017). (12 pages in English).

Wang, Meng, et al. "3densinet: A robust neural network architecture towards 3d volumetric object prediction from 2d image." *Proceedings of the 25th ACM international conference on Multimedia*. 2017. (9 pages in English).

Park, Jeong Joon, et al. "Deepsdf: Learning continuous signed distance functions for shape representation." *Proceedings of the IEEE/CVF Conference on Computer Vision and Pattern Recognition*. 2019. (10 pages in English).

Mescheder, Lars, et al. "Occupancy networks: Learning 3d reconstruction in function space." *Proceedings of the IEEE/CVF Conference on Computer Vision and Pattern Recognition*. 2019. (11 pages in English).

* cited by examiner

METHOD AND APPARATUS WITH FEATURE EMBEDDING

CROSS-REFERENCE TO RELATED APPLICATIONS

This application claims the benefit under 35 USC § 119(a) of Korean Patent Application No. 10-2020-0121531, filed on Sep. 21, 2020, in the Korean Intellectual Property Office, the entire disclosure of which is incorporated herein by reference for all purposes.

BACKGROUND

1. Field

The following description relates to a method and apparatus with feature embedding.

2. Description of Related Art

In a typical approach, an object included in an image with an individual original pixel intensity may be identified by extracting a low-dimensional feature vector of the image through a neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes estimating a depth map for each of plural two-dimensional (2D) input images, transforming the depth maps into three-dimensional (3D) information in a point cloud form based on an aggregation of the depth maps, and generating an embedded feature by applying the 3D information to a machine learning model, where the embedded feature includes information about a 3D shape corresponding to a 2D object in the plural 2D input images.

The transforming may include incrementally aggregating the depth maps, and transforming a result of the incremental aggregating into the 3D information.

The transforming may include unprojecting the depth maps to a 3D space using a camera parameter corresponding to the plural 2D input images.

The transforming may include unprojecting the depth maps to the 3D space to calculate positions of 3D points that correspond to pixels corresponding to the 2D object in the plural 2D input images, and transforming the depth maps into the 3D information based on the calculated positions of the 3D points.

The plural 2D input images may be multi-view images or a sequence image.

The plural 2D input images may be multi-view images, and the 3D information may include information indicating respective surfaces of the 3D shape corresponding to respective views of the plural 2D input images.

The machine learning model may be a neural network, and the generating of the embedded feature may include transforming the 3D information into information of a dimension corresponding to an input layer of the neural network, generating the embedded feature by applying the information of the dimension to the neural network.

The transforming of the 3D information into the information of the dimension may include transforming the 3D information into the information of the dimension using at least one of a multilayer perceptron (MLP) and a graph convolutional network (GCN).

The machine learning model may be a neural network, and the generating of the embedded feature may include generating the embedded feature to include information about the 3D shape, representing depth values of all pixels corresponding to the 2D object included in the plural 2D input images, by applying the 3D information to the neural network.

The embedded feature may be in a form of one of a feature map and a feature vector.

The method may further include reconstructing the 2D object as a 3D object based on the embedded feature.

The reconstructing of the 2D object as the 3D object may include estimating a probability that a display pixel corresponding to the embedded feature is located inside or outside the 3D shape, and reconstructing the 2D object as the 3D object based on the estimated probability.

The estimating of the depth map for each of the plural 2D input images may include estimating respective depth maps from each of the plural 2D input images using a neural network that is trained to estimate depth.

The method may further include obtaining respective intrinsic and extrinsic parameters corresponding to the plural 2D input images, and performing the transforming dependent on the obtained respective intrinsic and extrinsic parameters.

In one general aspect, one or more embodiments may include a non-transitory computer-readable storage medium storing instructions that, when executed by a processor, cause the processor to perform one or more or all operations, processes, or methods described herein.

In one general aspect, an apparatus includes a processor configured to estimate a depth map for each of plural two-dimensional (2D) input images, transform the depth maps into three-dimensional (3D) information in a point cloud form based on an aggregation of the depth maps, and generate an embedded feature by applying the 3D information to a machine learning model, were the embedded feature includes information about a 3D shape corresponding to a 2D object included in the plural 2D input images.

For the transforming, the processor may be configured to incrementally aggregate the depth maps and transform a result of the incremental aggregation into the 3D information.

For the transforming, the processor may be configured to unproject the depth maps to a 3D space using a camera parameter corresponding to the plural 2D input images.

The processor may be configured to unproject the depth maps to the 3D space to calculate positions of 3D points that correspond to pixels corresponding to the 2D object in the plural 2D input images, transform the depth maps into the 3D information based on the calculated positions of the 3D points.

The plural 2D input images may be multi-view images or a sequence image.

The plural 2D input images may be multi-view images, and the 3D information may include information indicating respective surfaces of the 3D shape corresponding to respective views of the plural 2D input images.

The machine learning model may be a neural network, and, for the generating of the embedded feature, the processor may be configured to transform the 3D information into information of a dimension corresponding to an input layer of the neural network, and generate the embedded feature by applying the information of the dimension to the neural network.

For the transforming of the 3D information into the information of the dimension, the processor may be configured to transform the 3D information into the information of the dimension using at least one of a multilayer perceptron (MLP) and a graph convolutional network (GCN).

The machine learning model may be a neural network, and, for the generating of the embedded feature, the processor may be configured to generate the embedded feature to include information about the 3D shape, representing depth values of all pixels corresponding to the 2D object included in the plural 2D input images, by applying the 3D information to the neural network.

The embedded feature may be in a form of one of a feature map and a feature vector.

The processor may be configured to reconstruct the 2D object as a 3D object based on the embedded feature.

For the reconstructing of the 2D object as the 3D object, the processor may be configured to estimate a probability that a display pixel corresponding to the embedded feature is located inside or outside the 3D shape, and reconstruct the 2D object as the 3D object based on the estimated probability.

For the estimating of the depth map for each of the plural 2D input images, the processor may be configured to estimate respective depth maps from each of the plural 2D input images using a neural network that is trained to estimate depth.

The apparatus may further include an interface configured to obtain the plural 2D input images, where the processor may be configured perform the transforming of the depth maps dependent on respective intrinsic and extrinsic parameters corresponding to the obtaining of the plural 2D input images.

The interface may be a communication interface.

The apparatus may be one of a 3D printer, a 3D scanner, an advanced driver-assistance system (ADAS), a head-up display (HUD), a 3D digital information display (DID), a navigation device, a neuromorphic device, a 3D mobile device, a smartphone, a smart television (TV), a smart vehicle, an Internet of Things (IoT) device, a medical device, and a measuring device.

The processor may be further configured to reconstruct the 2D object as a 3D object, based on the embedded feature, and the apparatus may be an augmented reality apparatus and further include a display controlled to display the reconstructed 2D object.

The apparatus may further include a memory, and the processor may be further configured to store the embedded feature in the memory.

In one general aspect, an augmented reality (AR) apparatus includes a communication interface configured to receive plural two-dimensional (2D) input images including multi-view images or a sequence image, a processor configured to estimate respective depth maps for the plural 2D input images, transform the respective depth maps into three-dimensional (3D) information in a point cloud form based on an aggregation of the respective depth maps, perform encoding of a feature to include information about a 3D shape corresponding to a 2D object included in the plural 2D input images by applying the 3D information to a neural network, and reconstruct the 3D shape corresponding to the 2D object based on the feature, and further include a display configured to display an output image including the 3D shape.

The apparatus may further include a memory, and the processor may be further configured to store the feature in the memory.

In one general aspect, an apparatus includes a memory storing an embedded feature that includes information about a 3D shape corresponding to a 2D object, a display, and a processor configured to reconstruct the 2D object as a 3D object based on the embedded feature and control display of the reconstructed 2D object, where the embedded feature is a feature reflecting having been generated based on depth maps for each of plural two-dimensional (2D) images, a transformation of the depth maps into three-dimensional (3D) information based on an aggregation of the depth maps, and by an application of the 3D information to a neural network.

Other features and aspects will be apparent from the following detailed description, the drawings, and the claims.

Figure 1:
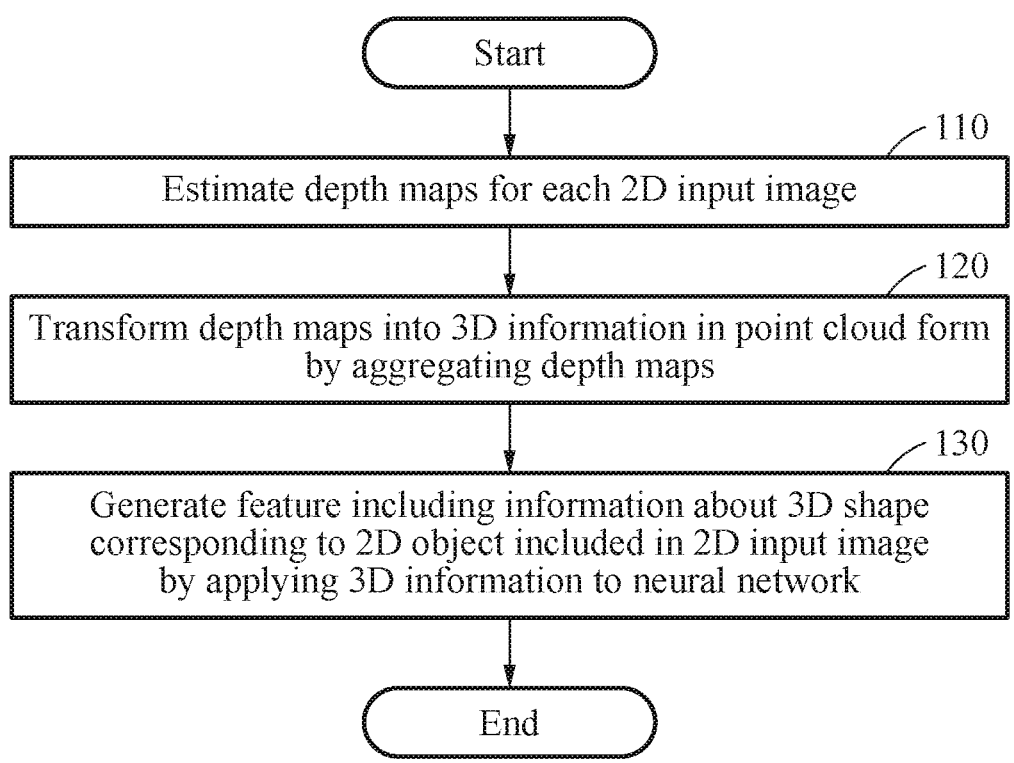
FIGS. 1 and 2 illustrate examples of feature embedding processes.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. Further, the following detailed descriptions are possessed or acquired by the inventor(s) in the course of conceiving the present disclosure. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the present disclosure may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

As used herein, the singular forms are intended to include the plural forms as well, unless the context clearly indicates otherwise. For example, the articles "a," "an," and "the" are intended to include the plural forms as well, unless the context clearly indicates otherwise. It should be further understood that the terms "comprises", "includes", "has", "comprising" "including", and "having", as non-limiting example, when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings, and like reference numerals in the drawings refer to like elements throughout.

As noted above, in a typical approach, an object included in an image with an individual original pixel intensity may be identified by extracting a low-dimensional feature vector of the image through a neural network. However, it is found that an approach may be unsatisfactory to sufficiently utilize information at each view, or to embed features by using similarity information between sequentially input images, if the sequentially input images are multi-view images or otherwise sequenced images.

Figure 2:
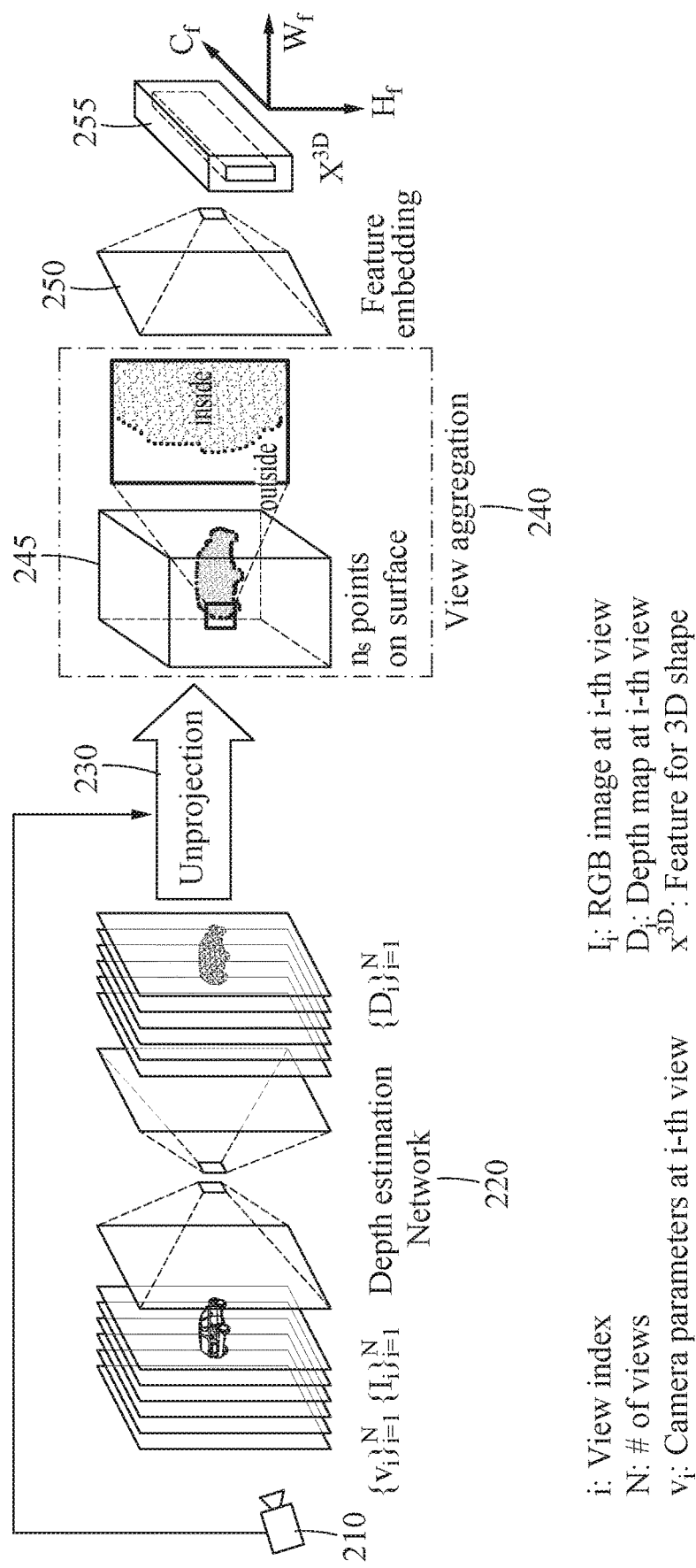

FIGS. 1 and 2 illustrate examples of feature embedding processes. For example, each of FIGS. 1 and 2 illustrate an example process in which feature embedding generates a feature that includes information about a three-dimensional (3D) shape corresponding to a two-dimensional (2D) object, for example, a vehicle, included in a 2D input image. An example apparatus herein with feature embedding may implement feature embedding processes.

In operation 110, the example apparatus estimates depth maps for each 2D input image. The 2D input image may be, for example, multi-view images including images captured at different views, or a sequence image including a plurality of image frames differentiated in time. Depending on example, the 2D input image may also be a single image. The 2D input image may be an RGB image. For example, the apparatus may estimate depth maps $\{D_i\}_{i=1}^{N}$ from 2D input images $\{I_i\}_{i=1}^{N}$ of each view, using a neural network (for example, a depth estimation network 220 of FIG. 2) that is trained to estimate a depth from an input image. In this example, i denotes a view index and N denotes a number of images.

The depth estimation network 220 may be, for example, a neural network that is trained to detect correspondence points in two or more 2D input images and to estimate depth maps from the multiple 2D input images through stereo matching, for example, to estimate a depth of an object in an image. Also, the depth estimation network 220 may be trained to estimate a depth map from a 2D input image using various schemes of obtaining depth information from a 2D image, in various examples.

In operation 120, the apparatus transforms the depth maps $\{D_i\}_{i=1}^{N}$ estimated in operation 110 to 3D information 245 in a point cloud form by aggregating the depth maps $\{D_i\}_{i=1}^{N}$. For example, the apparatus may perform an unprojection 230 of the depth maps $\{D_i\}_{i=1}^{N}$ to a 3D space using a camera parameter $\{V_i\}_{i=1}^{N}$ corresponding to each 2D input image, to transform the depth maps $\{D_i\}_{i=1}^{N}$ to the 3D information 245. The "camera parameter corresponding to each 2D input image" may be construed to be a camera parameter $\{V_i\}_{i=1}^{N}$ of a camera 210 that captures each 2D input image.

The camera parameter $\{V_i\}_{i=1}^{N}$ may include one or more intrinsic parameters and one or more extrinsic parameters. The intrinsic parameter may include, for example, a focal length (fx, fy) corresponding to a distance between an image sensor and a center of a lens of a camera, a principal point (cx, cy), and a skewness coefficient. A focal length f may be expressed in units of pixels. Also, fx may represent how many times a size of a horizontal cell or a gap between horizontal cells the focal length is, and fy may represent how many times a size of a vertical sensor cell or a gap between vertical sensor cells the focal length is. A principal point c may correspond to image coordinates of a foot of a perpendicular line drawn from the center of the lens of the camera (e.g., a pinhole) to the image sensor. The skewness coefficient may be a degree by which a y axis of a cell array of the image sensor is skewed. Also, the extrinsic parameter may be a parameter that describes a transformation relationship between a camera coordinate system and a world coordinate system, and may be represented by rotation and translation transformation between the camera coordinate system and the world coordinate system, for example. In an example, the extrinsic parameter may not be a unique parameter of the camera and may correspond to a parameter, for example, an installation height of the camera or an installation direction such as a pan or a tilt, associated with a geometric relationship between the camera and an external space. Also, the extrinsic parameter may vary depending on how the world coordinate system is defined in various examples.

For example, in operation 120, the apparatus may obtain features in forms of 3D volumes in the world coordinate system by performing the unprojection 230 of a depth map estimated from each input view image based on an intrinsic parameter and an extrinsic parameter of the camera. In this example, the features in the forms of the 3D volumes may be fused into a single volume using, for example, a convolution-based recurrent neural network (RNN) module or a gated recurrent unit (GRU), which may then be applied or provided to a machine learning model 250, e.g., a neural network 250.

The example neural network 250 may be, for example, a convolutional neural network (CNN), a convolutional long-short term memory (ConvLSTM) network, a convolutional GRU (ConvGRU) network, or a neural network of a recurrent structure such as an RNN, as non-limiting examples.

The apparatus may obtain a set $\{X|X \in \mathbb{R}^3\}$ of point clouds in the world coordinate system by performing the unprojection 230 of the depth maps $\{D_i\}_{i=1}^N$ to the 3D space, as shown in Equation 1 below, using a camera parameter corresponding to each view of a corresponding 2D input image together with a depth map estimated for each of the camera views.

$$X_w = [R^T | -R^T t] K^{-1} \tilde{u}$$  Equation 1

Figure 3:
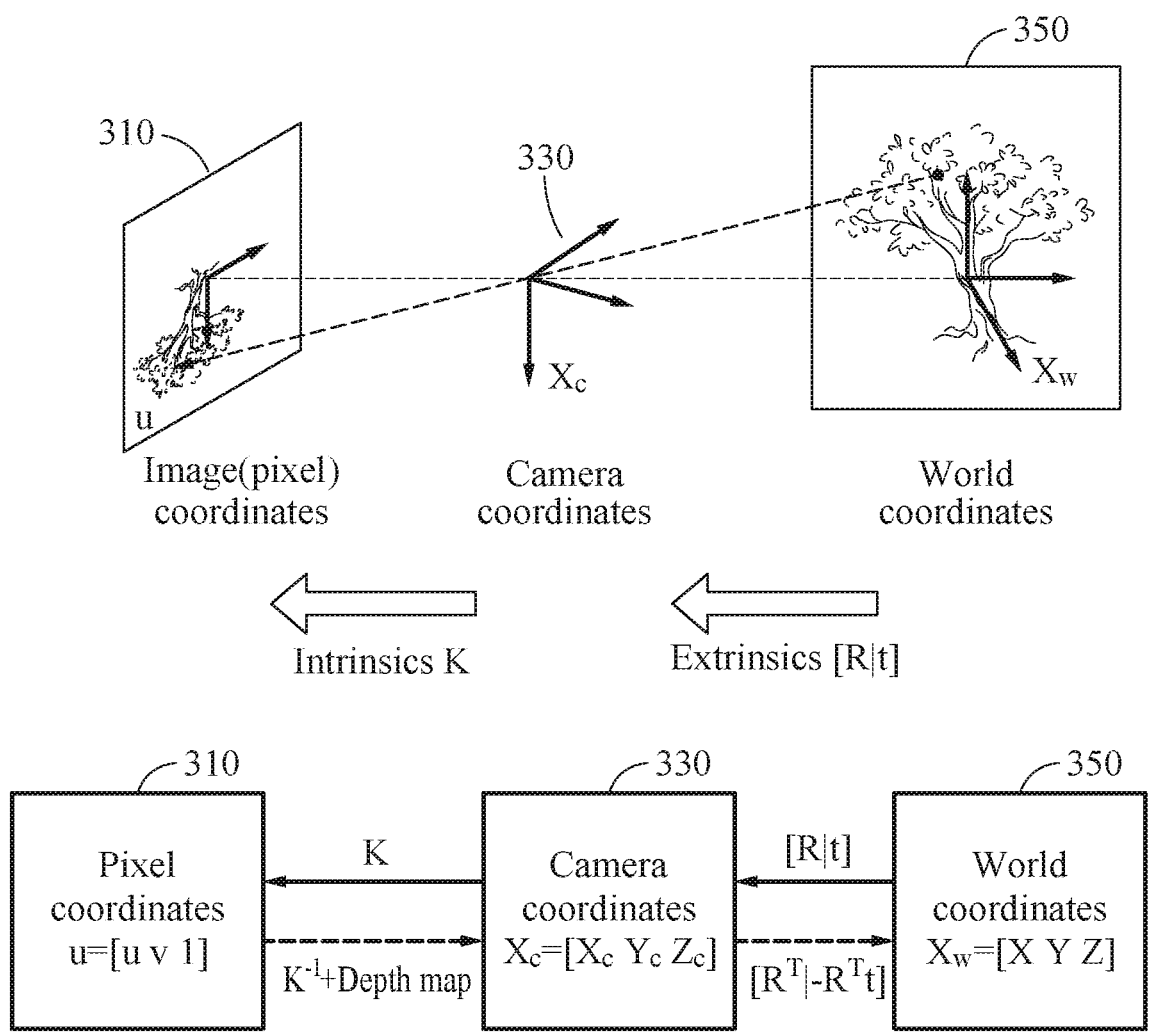
FIG. 3 illustrates an example of an unprojection concept.

In Equation 1, and as illustrated in FIG. 3 discussed further below, $X_w$ denotes a position of the point cloud corresponding to a set of 3D points, and K denotes a projection matrix of the camera. R denotes a 3×3 rotation matrix, and t denotes a 3×1 translation vector. Also, $\tilde{u}$ denotes $[uZ_c \ vZ_c \ Z_c]^T$, that is, a value obtained by multiplying a depth value $Z_c$ of each pixel by homogeneous coordinates [u v 1] of a pixel position in a 2D input image.

An example in which the apparatus performs the unprojection 230 of the depth maps $\{D_i\}_{i=1}^N$ to the 3D space will be further described below with reference to FIG. 3.

3D information obtained from 2D input images at each view may represent a respective surface of a 3D shape corresponding to a 2D object observed at a corresponding view. The apparatus may obtain a single shape represented in the point cloud form in the 3D space by aggregating depth maps estimated for the 2D input images at all views. The single shape represented in the point cloud form may correspond to the 3D information 245.

The apparatus may perform an incremental aggregation 240 of the depth maps $\{D_i\}_{i=1}^N$ for each 2D input image and may transform the depth maps $\{D_i\}_{i=1}^N$ into the 3D information 245.

The 3D information in the point cloud form, obtained through the above-described process, may then be embedded as a single 3D shape or features including information about the 3D shape. Herein, "embedding" may be construed as a projecting of data of one dimension to data of another dimension. In an example, a number of dimensions of data input to the neural network 250 may be reduced through embedding, and accordingly one or more examples demonstrate an increase a computation speed and reduction in computing resources.

Additional examples of the transform the depth maps $\{D_i\}_{i=1}^N$ to the 3D information 245, by incrementally aggregating the depth maps $\{D_i\}_{i=1}^N$, will be described in greater depth further below with reference to FIGS. 4 and 5. The 3D information 245 may include information representing an exterior, for example, surface or extent of a 3D shape corresponding to the 2D object, for example, a vehicle presented in the input 2D images, and thus, may also correspond to 3D points corresponding to pixels corresponding to the inside of the vehicle.

In operation 130, the apparatus generates a feature $X^{3D}$ 255 including information about the 3D shape corresponding to the 2D object included in the 2D input image $\{I_i\}_{i=1}^N$, by applying or providing the 3D information 245 obtained in operation 120 to the neural network 250. The neural network 250 may be, for example, an encoder, or an autoencoder that includes an encoder portion and a decoder portion, as non-limiting examples.

The feature $X^{3D}$ 255 may be in a form of one of a feature map and a feature vector, however, is not necessarily limited thereto. The feature $X^{3D}$ 255 may be expressed in various forms capable of including information about a 3D shape.

The apparatus may generate the feature 255 including information about the 3D shape, e.g., including depth values of all pixels presented or corresponding to the 2D object included in the 2D input images, by applying or providing the 3D information 245 obtained in operation 120 to the neural network 250. An example in which the apparatus generates a feature by applying 3D information to such a neural network will be further described below with reference to FIG. 6.

The apparatus may thus reconstruct the 2D object into a 3D object based on the feature $X^{3D}$ 255 generated in operation 130. Such an example in which the apparatus reconstructs a 2D object included in a 2D input image into a 3D object will be described in greater detail below with reference to FIG. 7B.

Through the above-described process, the apparatus may generate a novel view image that may not otherwise be observed or observable from the 2D input images obtained at a single view or a plurality of views. Also, the apparatus may recognize a 3D shape corresponding to the 2D object included in the 2D input image(s), or may retrieve a 3D model corresponding to the 2D object.

FIG. 3 illustrates an example of the concept of unprojection. FIG. 3 illustrates a process of obtaining an image based on a pinhole camera model, and illustrates a transformation relationship between pixel coordinates 310 in 2D or the image plane, camera coordinates 330, and world coordinates 350 in 3D.

The pinhole camera model may correspond to a model representing a geometric projection relationship between the 3D space and the 2D image plane.

An example apparatus may calculate pixel coordinates 310 corresponding to the world coordinates 350 by projecting the world coordinates 350 to a 2D image using an extrinsic parameter [R|t] and an intrinsic parameter K in the pinhole camera model of FIG. 3. The extrinsic parameter [R|t] may correspond to a rotation/translation transformation matrix to transform the 3D world coordinate system to the camera coordinate system.

To obtain the world coordinates 350 corresponding to the pixel coordinates 310 from the pixel coordinates 310, a distance, for example, a depth value, from the camera coordinates 330 to the world coordinates 350 may be known or predetermined.

In an example, the apparatus may perform feature embedding by obtaining a 3D shape from a 2D input image including a 2D object based on the above-described pinhole camera model.

For example, when a depth map is estimated from a 2D input image with the pixel coordinates 310 using a trained neural network or a deep learning-based algorithm, as non-limiting examples, the apparatus may unproject the depth map to a 3D space, that is, to the world coordinates 350 using the camera model parameters. Through the unprojecting, the apparatus may calculate positions of 3D points corresponding to pixels corresponding to a 2D object included in the 2D input image. The apparatus may transform the depth map into 3D information based on the positions of the 3D points corresponding to the pixels corresponding to the 2D object. In this example, the 3D information may correspond to a 3D shape in the point cloud form. The apparatus, among other operations, may perform feature embedding for the 3D shape by applying 3D information in the point cloud form to the neural network. Through the above-described example process, the apparatus may obtain a new feature with information about the 3D shape from the 2D input image.

Figure 4:
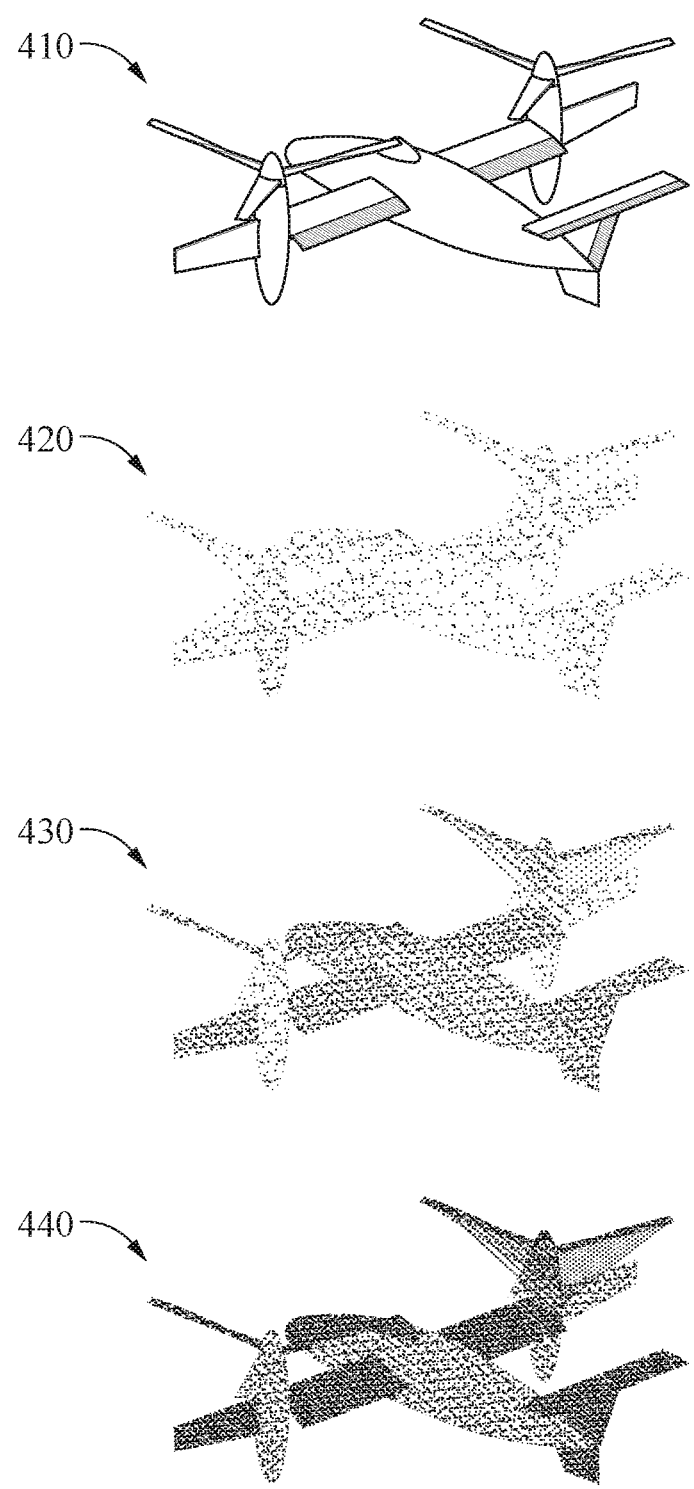
FIG. 4 illustrates an example of a process in which depth maps are incrementally aggregated.

FIG. 4 illustrates an example of a process in which depth maps corresponding to a sequence image are incrementally aggregated. FIG. 4 illustrates a 2D input image 410, and depth maps 420, 430 and 440 that are estimated from the 2D input image 410.

In this example, the 2D input image 410 may be assumed as a sequence image including image frames corresponding to times t−1, t and t+1.

An example apparatus may incrementally aggregate depth maps estimated for each image frame included in the sequence image, and may transform the depth maps into 3D information.

The apparatus may estimate the depth map 420 from the image frame corresponding to the time t−1, may aggregate a depth map of the time t estimated from the image frame corresponding to the time t with the depth map 420, and may obtain the depth map 430. Also, the apparatus may aggregate a depth map of the time t+1 estimated from the image frame corresponding to the time t+1 with the depth map 430, and may obtain the depth map 440.

Thus, the depth map 440 that is finally obtained by incrementally aggregating depth maps for each input image may include enriched information corresponding to the 2D object, for example, the example airplane, included in the 2D input image 410, that is, information about a more clear shape of the airplane.

Figure 5:
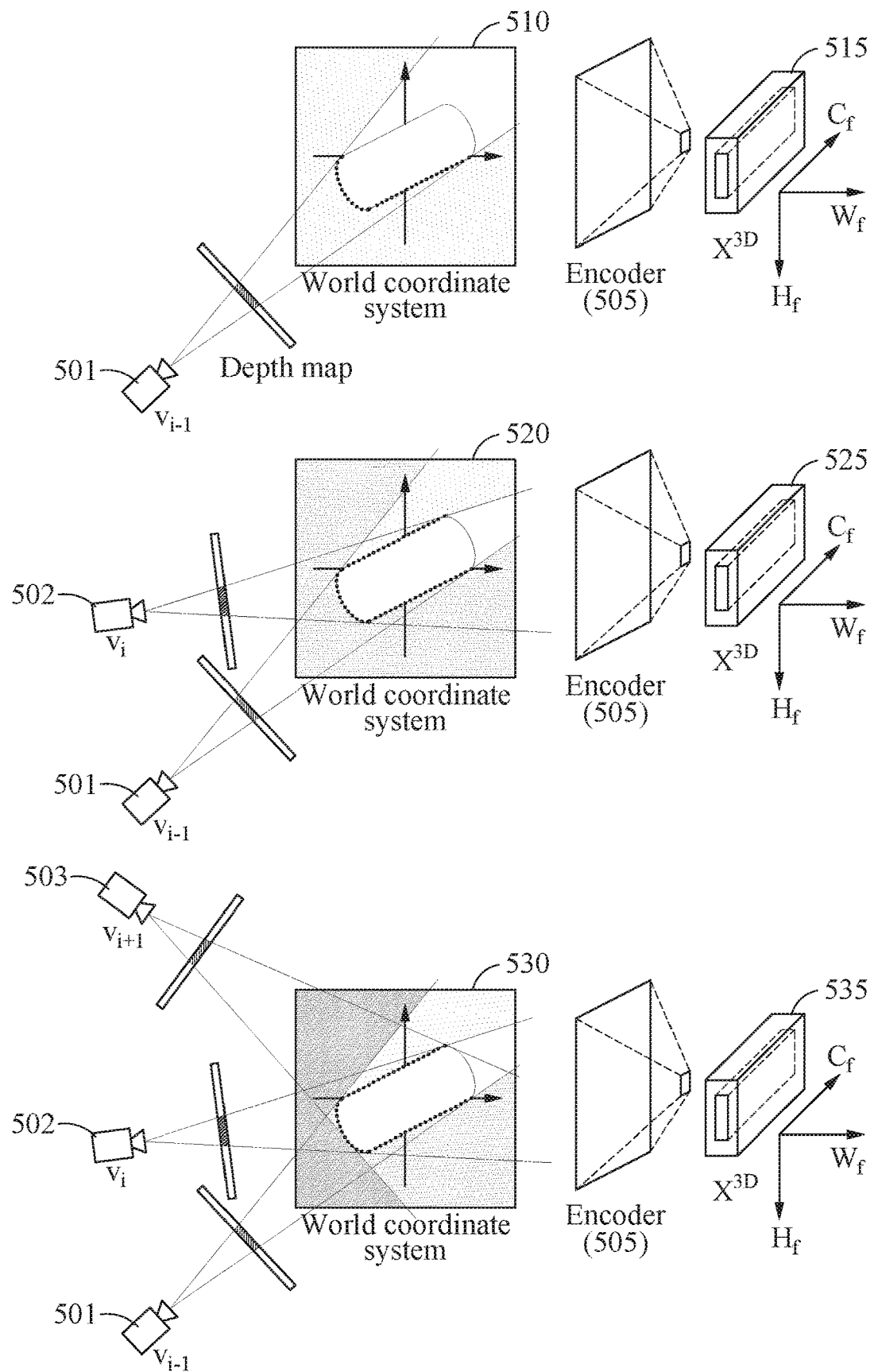
FIG. 5 illustrates an example of a process in which depth maps corresponding to multi-view images are incrementally aggregated.

FIG. 5 illustrates an example of a process in which depth maps corresponding to multi-view images are incrementally aggregated. FIG. 5 illustrates cameras 501, 502 and 503, 3D information 510, 520 and 530, and resultant features 515, 525 and 535. The cameras 501, 502 and 503 may capture 2D input images. The 3D information 510, 520 and 530 may be obtained by unprojecting depth maps estimated from each of input images at the different views (for example, views $v_{i-1}$, $v_i$ and $v_{i+1}$) captured by the cameras 501, 502 and 503 to a 3D space of the world coordinate system. The features 515, 525 and 535 may be generated by applying the 3D information 510, 520 and 530 to an encoder 505, for example. The cameras 501, 502 and 503 may capture images at different positions, for example, the views $v_{i-1}$, $v_i$ and $v_{i+1}$, or may be fixed at the same position to capture plural images. The encoder 505 may be configured by a PointNet or a 3D CNN based on a CNN structure. Depending on examples, the encoder 505 may embed features extracted from a plurality of consecutive images into an image.

For example, an input image of the view $v_{i-1}$ is assumed to be captured by the camera 501. In this example, an example apparatus, among other operations, may transform a depth map estimated from the input image of the view $v_{i-1}$ into the 3D information 510 by unprojecting the depth map to the 3D space. The 3D information 510 may include positions of 3D points corresponding to pixels corresponding to a 2D object included in the input image of the view $v_{i-1}$.

The apparatus may generate the feature $X^{3D}$ 515 including information about a 3D shape corresponding to the 2D object included in the input image of the view $v_{i-1}$, by applying the 3D information 510 to the encoder 505. The feature 515 may correspond to, for example, a 3D feature map or a 3D vector whose size is $[H_f, W_f, C_f]$. $H_f$, $W_f$, and $C_f$ may represent a height, a width, and a channel of a feature map, respectively.

When an input image of the view $v_i$ is captured by the camera 502, the apparatus may aggregate the depth map estimated from the input image of the view $v_{i-1}$ and a depth map estimated from the input image of the view $v_{i-1}$ may unproject the depth maps to the 3D space, and may transform the depth maps into the 3D information 520. The apparatus may generate the feature $X^{3D}$ 525 including information about a 3D shape corresponding to 2D objects included in the input image of the view $v_{i-1}$ and the input image of the view $v_i$, by applying the 3D information 520 to the encoder 505.

When an input image of the view $v_{i+1}$ is captured by the camera 503, the apparatus may aggregate the depth map estimated from the input image of the view $v_{i-1}$, the depth map estimated from the input image of the view $v_i$, and a depth map estimated from the input image of the view $v_{i+1}$, may unproject the depth maps to the 3D space, and may transform the depth maps corresponding to the input image of the view $v_{i-1}$, the input image of the view $v_i$, and the input image of the view into the 3D information 530. The apparatus may generate the feature $X^{3D}$ 535 including information about a 3D shape corresponding to 2D objects included in each of the input image of the view $v_{i-1}$, the input image of the view $v_i$, and the input image of the view $v_{i+1}$, by applying the 3D information 530 to the encoder 505.

For example, multi-view images such as images at the views $v_{i-1}$, $v_i$ and $v_{i+1}$ may be transformed to single 3D geometry information such as the 3D information 530, and thus it is possible to more quickly and easily perform feature embedding of a 3D shape.

Figure 6:
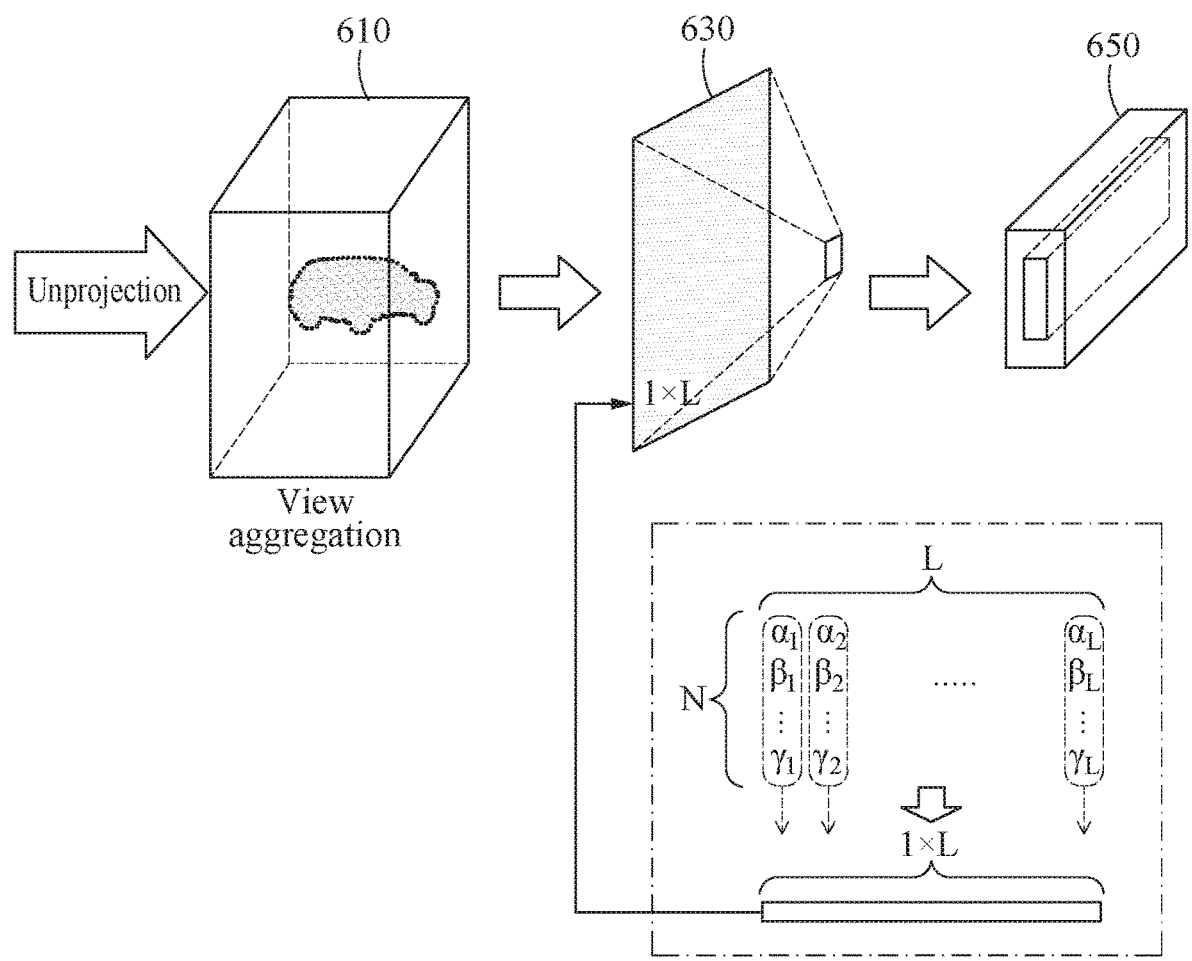
FIG. 6 illustrates an example of a process of generating a feature including information about a three-dimensional (3D) shape from 3D information.

FIG. 6 illustrates an example of a process of generating a feature including information about a 3D shape from 3D information. FIG. 6 illustrates a process in which a feature 650 includes information about a 3D shape by applying 3D information 610 in a point cloud form obtained through the above-described unprojection process to a neural network 630.

An example apparatus may, among other things, transform the 3D information 610 in the point cloud form obtained through the above-described unprojection process into information of a dimension corresponding to an input layer of the neural network 630. For example, the apparatus may transform x, y and z coordinates of each of "N" points into L-dimensional vectors, and may extract (1×L)-dimensional information from (N×L)-dimensional information in which the L-dimensional vectors are accumulated. The apparatus may use a multilayer perceptron (MLP) or a graph convolutional network (GCN) to transform x, y and z coordinates of each of "N" points into L-dimensional vectors, however, examples are not limited thereto. In this example, L may be greater than "3", and the apparatus may extract the (1×L)-dimensional information by performing max pooling of each column in the (N×L)-dimensional information.

The input layer of the neural network 630 may have a structure corresponding to a 1×L dimension. The apparatus may generate the feature 650 by applying the extracted (1×L)-dimensional information to the neural network 630.

Figure 7A:
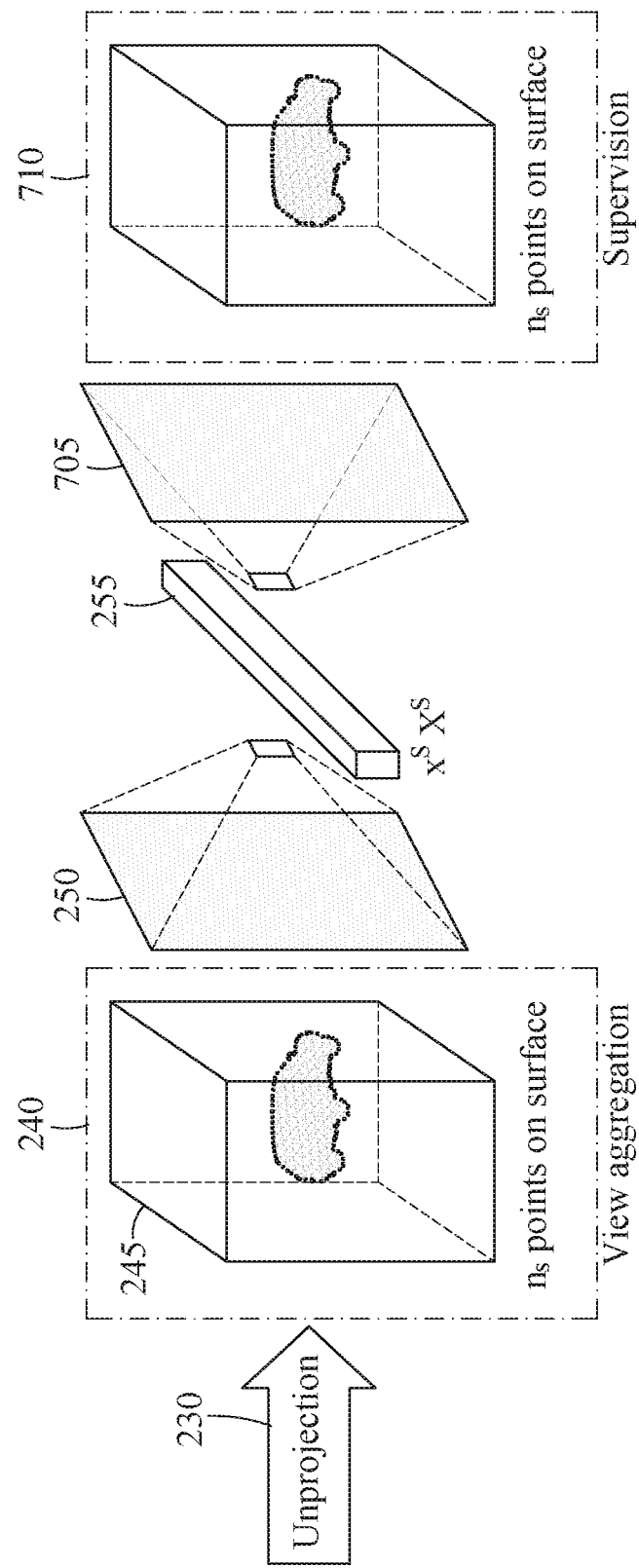
FIG. 7A illustrates an example of a training of a neural network.

FIG. 7A illustrates an example of a process of training a neural network. Referring to FIG. 7A, an example apparatus aggregates depth maps estimated from a single input image or multiple input images using a trained depth estimation network, performs an unprojection 230 of the depth maps to a 3D space, and obtains 3D information 245. The apparatus may transform the 3D information 245 using the above-described scheme of FIG. 6 and may input the 3D information 245 to the neural network 250, to obtain an encoded feature 255. The apparatus may restore 3D information 710 using a decoder neural network 705 corresponding to the neural network 250. In this example, the neural network 250 may correspond to an encoding portion of an autoencoder, and the decoder neural network 705 may correspond to a decoding portion of the autoencoder.

The apparatus may determine a loss based on a difference between the restored 3D information 710 and the original 3D information 245, and may train the neural network 250 and the decoder neural network 705 based on the determined loss. Depending on examples, the neural network 250 may be trained using a generative adversarial network (GAN) that uses an autoencoder as a generator, for example. Also, in an example, a symmetric type auto-encoder having such an encoder and decoder with shared parameters may be implemented. In various examples, the apparatus may be any or any combination of the apparatuses described herein, and be configured to implement any combination or all corresponding operations, in addition as the training of the neural network 250, for example.

Figure 7B:
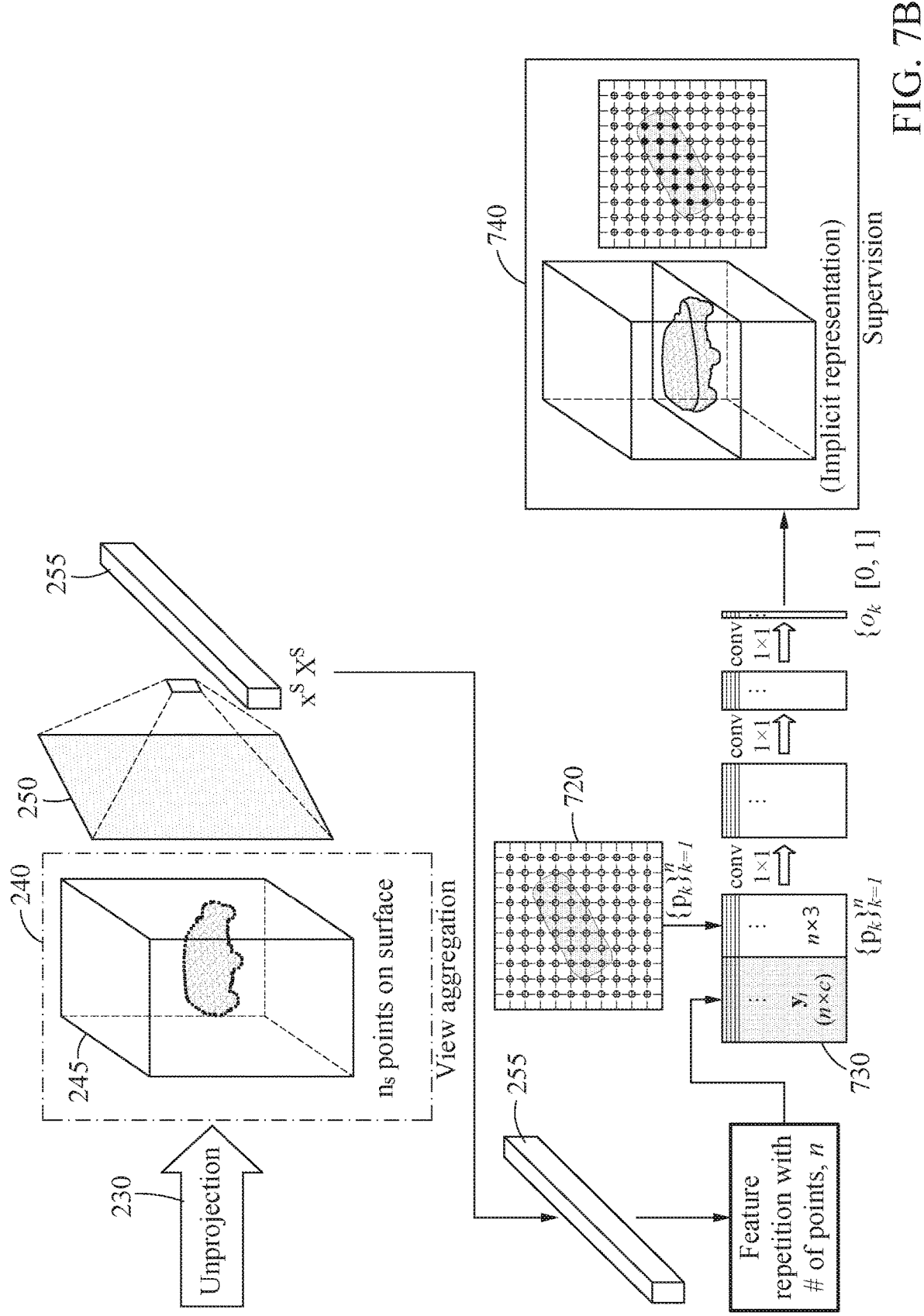
FIG. 7B illustrates an example of a reconstructing of a two-dimensional (2D) object into a 3D object.

FIG. 7B illustrates an example of a process of reconstructing a 2D object into a 3D object. Referring to FIG. 7B, an embedding feature may be used to determine whether a point in a 3D space is located inside or outside an object.

An example apparatus may, among other things, obtain a feature 255 of a 3D shape for a 2D object included in an input image, using the neural network 250 that is trained through the above-described process of FIG. 7A.

The apparatus may transform the feature 255 to a shape feature $y_i$ (n×c) by repeating the feature 255 the same number of times as a number of points included in a plane 720 in the 3D space. In the shape feature $y_i$ (n×c), n denotes the number of points included in the plane 720, and c denotes a length or a dimension of the feature 255. For example, the apparatus may set a sufficiently large number of 3D points $\{p_k\}_{k=1}^n$ in the plane 720 of the world coordinate system, and may estimate a respective probability of whether each 3D point position $p_k$ is inside or outside the 3D shape. The apparatus may reconstruct a 2D object into a 3D object based on the estimated probability.

For example, the apparatus may combine the shape feature $y_i$ with each 3D point position $p_k$ in operation 730, which may be used as an input of a nonlinear function or a nonlinear neural network, for example, an MLP or a GCN.

The apparatus may obtain a probability value $o_k$ corresponding to positions $p_k$ of 3D points as a result value of the nonlinear function or the nonlinear neural network. In this example, the probability value $o_k$ may correspond to a probability, for example, an occupancy rate, that a 3D point located at a position $p_k$ occupies the inside of the object. The probability value $o_k$ may have a value between "0" and "1". The apparatus may reconstruct a 3D object 740 by repeating the above-described process with respect to a plurality of planes included in the 3D space.

Depending on examples, the apparatus may reconstruct the 3D object 740 using a feature map or feature vectors obtained from intermediate layers of the depth estimation network 220 of FIG. 2 together with the feature 255 of the 3D shape. For example, 2D input images may be assumed as "N" multi-view images or a sequence image that includes "N" sequential image frames. Also, the depth estimation network 220 may be assumed as a deep neural network including a plurality of layers. In this example, the apparatus may obtain a feature map or feature vectors for each input image in the intermediate layers of the depth estimation network 220.

The apparatus may compress "N" features 255 obtained from each of the "N" multi-view images or "N" image frames into a single feature x' through max pooling. In this example, the feature map or feature vectors obtained from the intermediate layers of the depth estimation network 220, together with the feature 255 of the 3D shape obtained through feature embedding, may be applied as inputs of a mapping function, to be transformed into a new shape feature y with integrated 2D information and 3D information.

To reconstruct the 3D shape, the apparatus may set a sufficiently large number of 3D points $\{p_k\}_{k=1}^n$ in the world coordinate system such as the plane 720, and may estimate a probability of whether each 3D point position $p_k$ is inside or outside the 3D shape. The apparatus may reconstruct a 2D object into a 3D object based on the estimated probability. The apparatus may estimate a probability that a 3D point position $p_k$ of a pixel corresponding to the feature 255 is inside the 3D shape. The apparatus may reconstruct a 2D object into a 3D object based on the estimated probability.

The apparatus may combine the new shape feature y with each 3D point position $p_k$, which may be used as an input of a nonlinear function, for example, an MLP or a GCN. The apparatus may obtain a probability value $p_k$ corresponding to a 3D point position $p_k$ as a result of the nonlinear function. The apparatus may input the positions of all the 3D points $\{p_k\}_{k=1}^n$ defined above and the new shape feature y to the nonlinear function, to reconstruct the 3D object 740 from probability values of all the 3D points.

Figure 8:
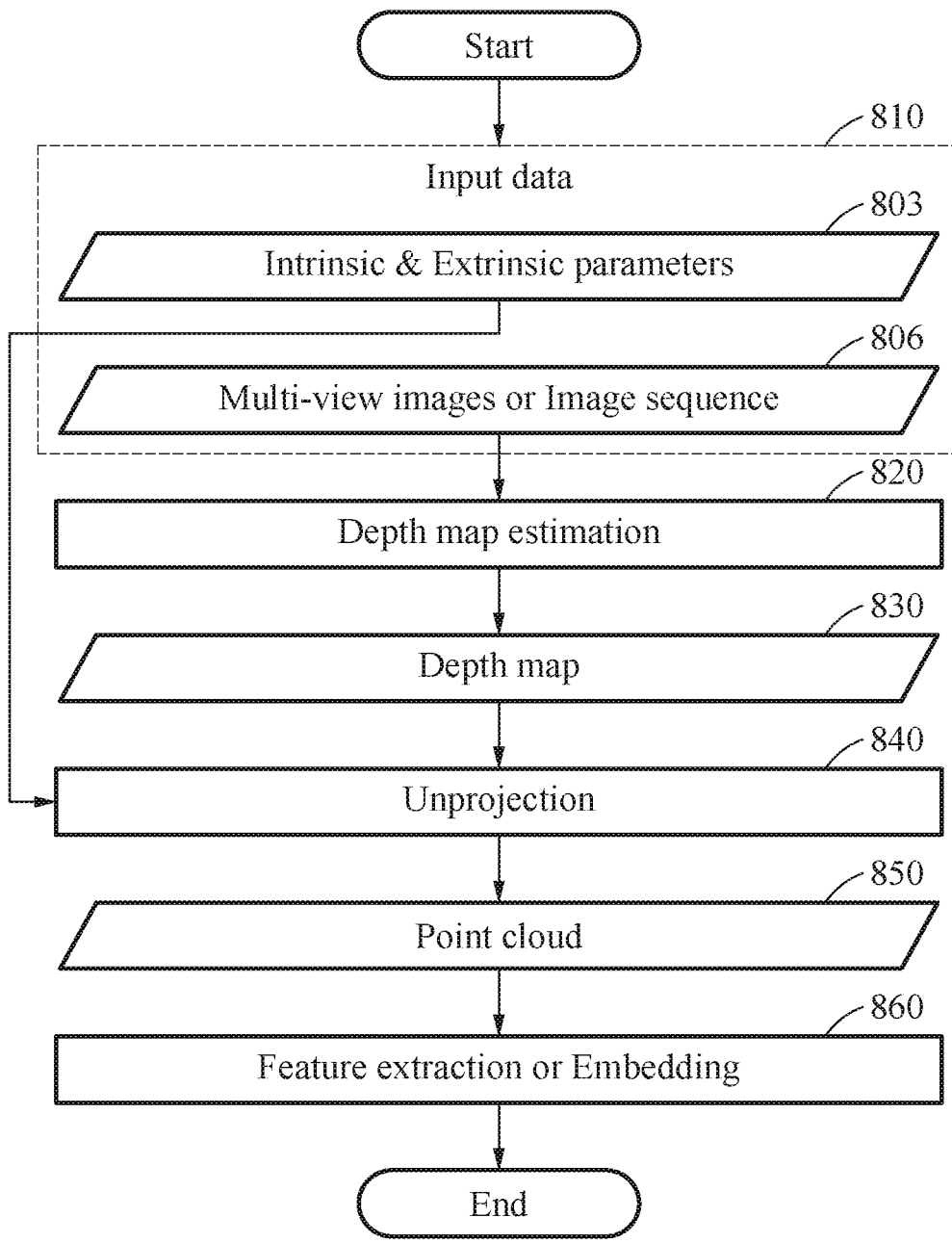
FIG. 8 illustrates an example of a feature embedding method.

FIG. 8 illustrates another example of a feature embedding method. FIG. 8 illustrates a process in which an example apparatus, among other things, extracts or embeds a feature including information about a 3D shape through operations 810 through 860.

In operation 810, the apparatus may receive input data. The apparatus may obtain a camera parameter including an intrinsic parameter and an extrinsic parameter in operation 803, and may receive or obtain multi-view images or a sequence image corresponding to a 2D input image of a 2D object in operation 806. Although operation 806 is performed after operation 803 as described above, however, examples are not limited thereto. For example, operation 803 may be performed after operation 806 is performed, or operations 803 and 806 may be simultaneously performed.

In operation 820, the apparatus may estimate depth maps for each image of either the multi-view images or the sequence image.

In operation 830, the apparatus may incrementally aggregate the estimated depth maps.

In operation 840, the apparatus may unproject the depth maps incrementally aggregated in operation 830 to a 3D space using the camera parameters obtained in operation 803.

In operation 850, the apparatus may transform the incrementally aggregated depth maps into 3D information in a point cloud form through operation 840.

In operation 860, the apparatus may extract a feature including information about a 3D shape corresponding to the 2D object included in the 2D input image, or may embed the information about the 3D shape, by applying the 3D information obtained in operation 850 to a neural network.

Figure 9:
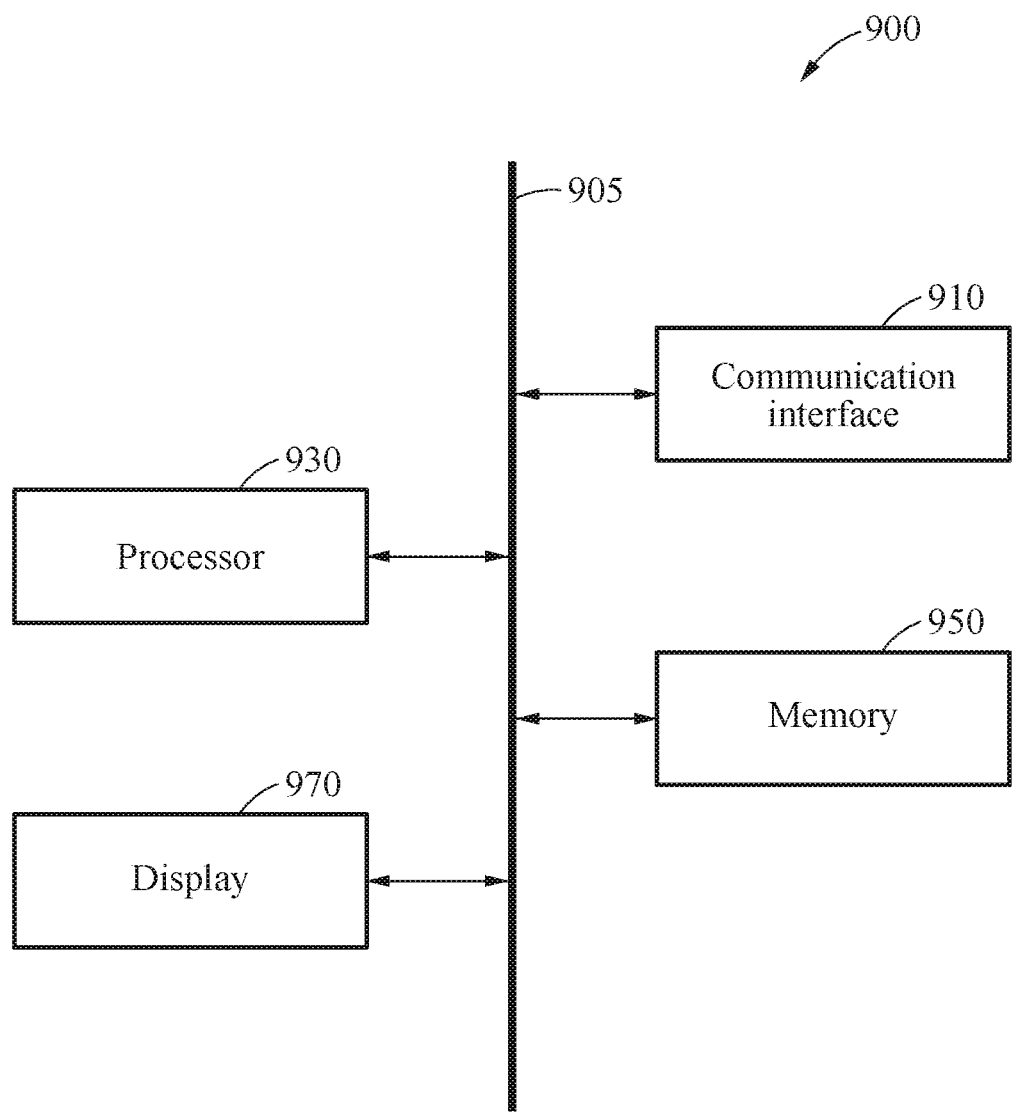
FIG. 9 illustrates an example of an apparatus with feature embedding.

FIG. 9 illustrates an example of an example apparatus 900. Referring to FIG. 9, the apparatus 900 may include a communication interface 910, a processor 930, a memory 950, and a display 970, as non-limiting examples. The communication interface 910, the processor 930, the memory 950 and the display 970 may be connected to each other via a communication bus 905.

The communication interface 910 may receive or obtain a 2D input image. Also, the communication interface 910 may obtain camera parameters including an intrinsic parameter and an extrinsic parameter corresponding to the 2D input image.

The processor 930 may estimate depth maps for each 2D input image. The processor 930 may transform the depth maps into 3D information in a point cloud form by aggregating the depth maps. The processor 930 may generate a feature information about a 3D shape corresponding to a 2D object included in a 2D input image by applying the 3D information to a neural network. Depending on examples, the processor 930 may reconstruct the 2D object into a 3D object based on the feature including the information about the 3D shape.

Also, the processor 930 may perform one or more or all of the operations, processes, and/or methods described above with reference to FIGS. 1 through 8. For example, the processor 930 may be a hardware-implemented data processing device having a circuit that is physically structured to execute desired operations. In an example, the processor 930 may implement such desired operations by executing code or instructions, which through execution by the processor 930 configure the processor 930 to implement such desired operations. Such code or instructions may be stored in the memory 950. The hardware-implemented data processing device may include, as non-limiting examples, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The memory 950 may store the 2D input image received or obtained by the communication interface 910 and/or the camera parameters corresponding to the 2D input image. Also, the memory 950 may store the 3D information in the point cloud form obtained by aggregating the depth maps by the processor 930, data generated by applying the 3D information to the neural network by the processor 930, and/or the feature including the information about the 3D shape generated by the processor 930. In addition, the memory 950 may store the 3D object that is reconstructed from the 2D object by the processor 930.

As described above, the memory 950 may store a variety of information generated in a processing process of the processor 930. Also, the memory 950 may store a variety of data and programs, execution of which may control the apparatus 900 to implement a variety of other operations. The memory 950 may include, for example, a volatile memory or a non-volatile memory. The memory 950 may include a large-capacity storage medium such as a hard disk to store a variety of data.

The apparatus 900 is representative of each of, for example, a 3D printer, a 3D scanner, an advanced driver-assistance system (ADAS), a head-up display (HUD), a 3D digital information display (DID), a navigation device, a neuromorphic device, a 3D mobile device, a smartphone, a smart television (TV), a smart vehicle, an Internet of Things (IoT) device, a medical device, and a measuring device, as non-limiting examples. For example, the 3D mobile device may be or include any of a head-mounted display (HMD), a face-mounted display (FMD), and a device to display any one or any combination of augmented reality (AR), virtual reality (VR) and mixed reality (MR), in varying examples.

For example, when the apparatus 900 is an AR device that is one of the 3D mobile devices, the processor 930 may perform encoding with the feature including the information about the 3D shape corresponding to the 2D object included in the 2D input image, by applying the 3D information to the neural network.

For example, and as applicable to various embodiments described herein, the processor 930 is further configured to consider additional mapping of input information, such as the RGB value of each pixel to a 3D object, e.g., through use of a skip connection. Accordingly, in addition to information based on the depth map, additional image information such as color or other image information may be additionally mapped to the 3D object.

The display 970 may display an output image including the 3D shape reconstructed by the processor 930, as well as the 3D shape reconstructed by the processor 930 with such additionally mapped color information.

The cameras, memories, processors, displays, communication interfaces, communication busses, as well as all other apparatuses, units, modules, devices, systems, and other components described herein with respect to FIGS. 1-9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
   estimating a depth map for each of plural two-dimensional (2D) input images;
   transforming the depth maps into three-dimensional (3D) information in a point cloud form based on an aggregation of the depth maps; and
   generating an embedded feature by applying the 3D information to a machine learning model,
   wherein the embedded feature includes information about a 3D shape corresponding to a 2D object in the plural 2D input images.

2. The method of claim 1, wherein the transforming comprises incrementally aggregating the depth maps, and transforming a result of the incremental aggregating into the 3D information.

3. The method of claim 1, wherein the transforming comprises unprojecting the depth maps to a 3D space using a camera parameter corresponding to the plural 2D input images.

4. The method of claim 3, wherein the transforming comprises:
unprojecting the depth maps to the 3D space to calculate positions of 3D points that correspond to pixels corresponding to the 2D object in the plural 2D input images; and
transforming the depth maps into the 3D information based on the calculated positions of the 3D points.

5. The method of claim 1, wherein the plural 2D input images are multi-view images or a sequence image.

6. The method of claim 5, wherein the plural 2D input images are multi-view images, and
the 3D information comprises information indicating respective surfaces of the 3D shape corresponding to respective views of the plural 2D input images.

7. The method of claim 1,
wherein the machine learning model is a neural network, and
wherein the generating of the embedded feature comprises:
transforming the 3D information into information of a dimension corresponding to an input layer of the neural network; and
generating the embedded feature by applying the information of the dimension to the neural network.

8. The method of claim 7, wherein the transforming of the 3D information into the information of the dimension comprises transforming the 3D information into the information of the dimension using at least one of a multilayer perceptron (MLP) and a graph convolutional network (GCN).

9. The method of claim 1, wherein the machine learning model is a neural network, and
wherein the generating of the embedded feature comprises generating the embedded feature to include information about the 3D shape, representing depth values of all pixels corresponding to the 2D object included in the plural 2D input images, by applying the 3D information to the neural network.

10. The method of claim 1, wherein the embedded feature is in a form of one of a feature map and a feature vector.

11. The method of claim 1, further comprising:
reconstructing the 2D object as a 3D object based on the embedded feature.

12. The method of claim 11, wherein the reconstructing of the 2D object as the 3D object comprises:
estimating a probability that a display pixel corresponding to the embedded feature is located inside or outside the 3D shape; and
reconstructing the 2D object as the 3D object based on the estimated probability.

13. The method of claim 1, wherein the estimating of the depth map for each of the plural 2D input images comprises estimating respective depth maps from each of the plural 2D input images using a neural network that is trained to estimate depth.

14. The method of claim 1, further comprising:
obtaining respective intrinsic and extrinsic parameters corresponding to the plural 2D input images and performing the transforming dependent on the obtained respective intrinsic and extrinsic parameters.

15. A non-transitory computer-readable storage medium storing instructions that, when executed by a processor, cause the processor to perform the method of claim 1.

16. An apparatus, the apparatus comprising:
a processor configured to:
estimate a depth map for each of plural two-dimensional (2D) input images;
transform the depth maps into three-dimensional (3D) information in a point cloud form based on an aggregation of the depth maps; and
generate an embedded feature by applying the 3D information to a machine learning model,
wherein the embedded feature includes information about a 3D shape corresponding to a 2D object included in the plural 2D input images.

17. The apparatus of claim 16, wherein, for the transforming, the processor is configured to incrementally aggregate the depth maps and transform a result of the incremental aggregation into the 3D information.

18. The apparatus of claim 16, wherein, for the transforming, the processor is configured to unproject the depth maps to a 3D space using a camera parameter corresponding to the plural 2D input images.

19. The apparatus of claim 18, wherein the processor is configured to:
unproject the depth maps to the 3D space to calculate positions of 3D points that correspond to pixels corresponding to the 2D object in the plural 2D input images; and
transform the depth maps into the 3D information based on the calculated positions of the 3D points.

20. The apparatus of claim 16, wherein the plural 2D input images are multi-view images or a sequence image.

21. The apparatus of claim 20, wherein the plural 2D input images are multi-view images, and the 3D information comprises information indicating respective surfaces of the 3D shape corresponding to respective views of the plural 2D input images.

22. The apparatus of claim 16, wherein the machine learning model is a neural network, and
wherein, for the generating of the embedded feature, the processor is configured to:
transform the 3D information into information of a dimension corresponding to an input layer of the neural network; and
generate the embedded feature by applying the information of the dimension to the neural network.

23. The apparatus of claim 22, wherein, for the transforming of the 3D information into the information of the dimension, the processor is configured to transform the 3D information into the information of the dimension using at least one of a multilayer perceptron (MLP) and a graph convolutional network (GCN).

24. The apparatus of claim 16, wherein the machine learning model is a neural network, and
wherein, for the generating of the embedded feature, the processor is configured to generate the embedded feature to include information about the 3D shape, representing depth values of all pixels corresponding to the 2D object included in the plural 2D input images, by applying the 3D information to the neural network.

25. The apparatus of claim 16, wherein the embedded feature is in a form of one of a feature map and a feature vector.

26. The apparatus of claim 16, wherein the processor is configured to reconstruct the 2D object as a 3D object based on the embedded feature.

27. The apparatus of claim 26, wherein, for the reconstructing of the 2D object as the 3D object, the processor is configured to:
estimate a probability that a display pixel corresponding to the embedded feature is located inside or outside the 3D shape; and reconstruct the 2D object as the 3D object based on the estimated probability.

28. The apparatus of claim 16, wherein, for the estimating of the depth map for each of the plural 2D input images, the processor is configured to estimate respective depth maps from each of the plural 2D input images using a neural network that is trained to estimate depth.

29. The apparatus of claim 16, further comprising an interface configured to obtain the plural 2D input images, wherein the processor is configured to perform the transforming of the depth maps dependent on respective intrinsic and extrinsic parameters corresponding to the obtaining of the plural 2D input images.

30. The apparatus of claim 29, wherein the interface is a communication interface.

31. The apparatus of claim 16, wherein the apparatus is one of a 3D printer, a 3D scanner, an advanced driver-assistance system (ADAS), a head-up display (HUD), a 3D digital information display (DID), a navigation device, a neuromorphic device, a 3D mobile device, a smartphone, a smart television (TV), a smart vehicle, an Internet of Things (IoT) device, a medical device, and a measuring device.

32. The apparatus of claim 16,
wherein the processor is further configured to reconstruct the 2D object as a 3D object, based on the embedded feature, and
wherein the apparatus is an augmented reality apparatus and further comprises a display controlled to display the reconstructed 2D object.

33. The apparatus of claim 16, further comprising a memory, and the processor is further configured to store the embedded feature in the memory.

34. An augmented reality (AR) apparatus comprising:
a communication interface configured to receive plural two-dimensional (2D) input images comprising multi-view images or a sequence image;
a processor configured to:
estimate respective depth maps for the plural 2D input images;
transform the respective depth maps into three-dimensional (3D) information in a point cloud form based on an aggregation of the respective depth maps;
perform encoding of a feature to include information about a 3D shape corresponding to a 2D object included in the plural 2D input images by applying the 3D information to a neural network; and
reconstruct the 3D shape corresponding to the 2D object based on the feature; and
a display configured to display an output image comprising the 3D shape.

35. The apparatus of claim 34, further comprising a memory, and the processor is further configured to store the feature in the memory.

36. An apparatus, the apparatus comprising:
a memory storing an embedded feature that includes information about a 3D shape corresponding to a 2D object;
a display; and
a processor configured to reconstruct the 2D object as a 3D object based on the embedded feature and control display of the reconstructed 2D object,
wherein the embedded feature is a feature reflecting having been generated based on depth maps for each of plural two-dimensional (2D) images, a transformation of the depth maps into three-dimensional (3D) information based on an aggregation of the depth maps, and by an application of the 3D information to a neural network.

* * * * *